United States Patent
Guo et al.

(10) Patent No.: US 9,596,673 B2
(45) Date of Patent: Mar. 14, 2017

(54) RESOURCE NEGOTIATION METHOD, DEVICE, AND SYSTEM FOR D2D COMMUNICATION

(71) Applicant: Huawei Technologies Co., Ltd., Shenzhen (CN)

(72) Inventors: Rui Guo, Shenzhen (CN); Lei Gong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 123 days.

(21) Appl. No.: 14/624,174

(22) Filed: Feb. 17, 2015

(65) Prior Publication Data
US 2015/0163770 A1 Jun. 11, 2015

Related U.S. Application Data

(63) Continuation of application No. PCT/CN2013/076928, filed on Jun. 7, 2013.

(30) Foreign Application Priority Data
Aug. 28, 2012 (CN) .......................... 2012 1 0310301

(51) Int. Cl.
*H04W 72/00* (2009.01)
*H04W 72/04* (2009.01)
(Continued)

(52) U.S. Cl.
CPC ....... *H04W 72/04* (2013.01); *H04W 72/0426* (2013.01); *H04W 4/005* (2013.01);
(Continued)

(58) Field of Classification Search
CPC . H04W 76/023; H04W 72/042; H04W 88/06; H04W 72/0453; H04W 8/005;
(Continued)

(56) References Cited

U.S. PATENT DOCUMENTS 8,902,855 B2 * 12/2014 Etemad ................. H04W 36/14
370/331
2009/0034447 A1 * 2/2009 Yu ....................... H04B 7/15542
370/315
(Continued)

FOREIGN PATENT DOCUMENTS

CN 102547871 A 7/2012
WO WO 2011147462 A1 12/2011
(Continued)

*Primary Examiner* — Olumide T Ajibade Akonai
(74) *Attorney, Agent, or Firm* — Leydig, Voit & Mayer, Ltd.

(57) ABSTRACT

A resource negotiation method, a device, and a system for D2D communication are provided. The method comprises: a second base station acquires an available channel resource of a first device, where the first device is connected with a first base station; the second base station allocates, on the basis of an available channel resource of a second device connected with self and of the available channel resource of the first device, a D2D communication resource for D2D communication between the first device and the second device; and the second base station notifies the second device of the allocated D2D communication resource and notifies the first device via the first base station. The resource negotiation method, the device, and the system for D2D communication implement resource negotiation for successful D2D communication between devices under different base stations or access points.

17 Claims, 14 Drawing Sheets

(51) Int. Cl.
  *H04W 16/14*    (2009.01)
  *H04W 4/00*    (2009.01)
(52) U.S. Cl.
  CPC .......... *H04W 16/14* (2013.01); *H04W 72/042* (2013.01); *H04W 72/0446* (2013.01)
(58) Field of Classification Search
  CPC ... H04W 76/043; H04W 92/18; H04W 16/14; H04W 36/14; H04W 72/0406; H04W 72/082; H04W 72/0446; H04W 24/02; H04W 4/005; H04W 72/04; H04W 76/02
  See application file for complete search history.

(56) References Cited

U.S. PATENT DOCUMENTS

| | | | |
|---|---|---|---|
| 2011/0228666 A1 | 9/2011 | Barbieri et al. | |
| 2011/0258327 A1 | 10/2011 | Phan et al. | |
| 2013/0150058 A1* | 6/2013 | Lim | H04W 72/048 455/450 |
| 2013/0157669 A1* | 6/2013 | Turtinen | H04W 48/12 455/450 |
| 2013/0294296 A1* | 11/2013 | Dimou | H04W 72/082 370/280 |
| 2014/0023008 A1 | 1/2014 | Ahn et al. | |
| 2014/0056230 A1* | 2/2014 | Dimou | H04W 72/048 370/329 |

FOREIGN PATENT DOCUMENTS

| WO | WO 2012091420 A2 | 7/2012 |
|---|---|---|
| WO | WO 2013048296 A1 | 4/2013 |

* cited by examiner

RESOURCE NEGOTIATION METHOD, DEVICE, AND SYSTEM FOR D2D COMMUNICATION

CROSS-REFERENCE TO RELATED APPLICATIONS

This application is a continuation of International Patent Application No. PCT/CN2013/076928 filed Jun. 7, 2013, which claims priority to Chinese Patent Application No. 201210310301.5, filed Aug. 28, 2012, both of which are hereby incorporated by reference in their entireties.

FIELD

The present disclosure relates to the network communication technology, in particular, to a resource negotiation method, a device and a system for D2D communication, which is in the field of communication technology.

BACKGROUND

The mobile communication network is developing for a higher transmission rate, a higher resource utilization rate and a larger network capacity, which leads to a higher requirement for radio spectrum resources in the future. However, available frequency resources for wireless communication are very limited. Thus, how to realize a transmission having a high rate and a large capacity with limited bandwidth resources is a research focus.

The device-to-device (D2D) technology refers to an inter-device direct communication in the data plane, which does not pass through a relay device (such as a base station or an access point). The D2D technology may be applied to a wireless network to improve resource utilization rate and network capacity, and further has the following advantages such as reducing the load of a cell base station, decreasing battery consumption, improving QoS of the wireless network, strengthening the structure of a lower level, providing a new service, and the like.

In the conventional technology, the following two structures are often adopted in the D2D communication. In one structure, signaling communication and data communication are preformed directly between devices, for example, the independent basic service set (IBSS) network in the wireless-fidelity (WiFi) network. In the other structure, each device maintains signaling communication with a base station while mutual communications between the devices are performed in the data plane, for example, the 3rd generation partnership project (3GPP). In process of establishing the D2D communication, a device needs to obtain available channel resources firstly. In the conventional technology, the D2D communication mainly is direct communication between different devices served by the same base station or the same access point, and the base station allocates channel resources for the D2D communication to both devices that perform the D2D communication.

The current D2D communication may realize the direct communication between different devices served by the same base station or the same access point, but for devices served by different base stations or different access points, D2D communication can not be established because resource negotiation for the D2D communication can not be performed.

SUMMARY

In view of above disadvantage of the conventional technology, a resource negotiation method, a device and a system for D2D communication are provided according to embodiments of the present disclosure, to realize a successful resource negotiation for D2D communication between devices served by different base stations or different access points, thereby establishing the D2D communication.

In a first aspect, a resource negotiation method for D2D communication is provided, which includes:

obtaining an available channel resource of a first device by a second base station, where the first device is connected to a first base station;

allocating, by the second base station, a D2D communication resource for a D2D communication between the first device and a second device based on an available channel resource of the second device connected to the second base station and the available channel resource of the first device; and notifying, by the second based station, the second device of the allocated D2D communication resource, and notifying, by the second based station, the first device of the allocated D2D communication resource via the first base station.

Before the process of allocating, by the second base station, the D2D communication resource for the D2D communication between the first device and the second device based on the available channel resource of the second device connected to the second base station and the available channel resource of the first device, a first possible implementation way of the first aspect further includes:

obtaining the available channel resource of the second device by the second base station.

Combining with the first aspect or the first possible implementation way of the first aspect, in a second possible implementation way, the process of obtaining the available channel resource of the first device by the second base station includes:

receiving, by the second base station, the available channel resource of the first device sent by the first base station.

Combining with the second possible implementation way of the first aspect, in a third possible implementation way, the available channel resource of the first device is an available channel list obtained by the first base station by querying the first device.

Combining with the second possible implementation way of the first aspect, in a fourth possible implementation way, the available channel resource of the first device is sent by the first base station in response to a D2D connection request sent by a core network, and the D2D connection request carries an identifier of the first base station, an identifier of the second base station, an identifier of the first device and an identifier of the second device; or the available channel resource of the first device is sent by the first base station when the first base station determines to perform a frequency point handoff of a D2D communication link between the first device and the second device.

Combining with the first possible implementation way of the first aspect, in a fifth possible implementation way, the process of obtaining the available channel resource of the first device and obtaining the available channel resource of the second device, by the second base station includes:

sending, by the second base station, an available channel list querying request carrying an identifier of the first device and an identifier of the second device to a database, and receiving, by the second base station, an available channel list of the first device and an available channel list of the second device which are returned from the database.

Combining with the fifth possible implementation way of the first aspect, before the process of sending, by the second base station, the available channel list querying request carrying the identifier of the first device and the identifier of the second device to the database, a sixth possible implementation way further includes:

receiving, by the second base station, a D2D connection request sent by a core network, wherein the D2D connection request carries an identifier of the first base station, an identifier of the second base station, the identifier of the first device and the identifier of the second device; or determining, by the second base station, to perform a frequency point handoff of a D2D communication link between the first device and the second device.

In a second aspect, another resource negotiation method for D2D communication is provided, which includes:

receiving, by a first base station, a notification message which is sent by a second base station and is for indicating a D2D communication resource for a D2D communication between a first device and a second device, wherein the D2D communication resource is allocated by the second base station, the first device is connected to the first base station, and the second device is connected to the second base station; and notifying, by the first base station, the first device of the D2D communication resource.

Before the process of receiving, by the first base station, the notification message which is sent by the second base station and is for indicating the D2D communication resource for the D2D communication between the first device and the second device, a first possible implementation way of the second aspect further includes:

sending, by the first base station, an available channel resource of the first device to the second base station.

Combining with the first possible implementation way of the second aspect, before the process of sending, by the first base station, the available channel resource of the first device to the second base station, a second possible implementation way further includes:

receiving, by the first base station, a D2D connection request sent by a core network, wherein the D2D connection request carries an identifier of the first base station, an identifier of the second base station, an identifier of the first device and an identifier of the second device; or determining, by the first base station, to perform a frequency point handoff of a D2D communication link between the first device and the second device.

In a third aspect, yet another resource negotiation method for D2D communication is provided, which includes:

receiving, by a second access point, a D2D connection request from a first access point, wherein the D2D connection request is sent by a first device and is for requesting an establishment of a D2D communication between the first device and a second device, the D2D connection request carries an available channel resource of the first device, an identifier of the first device and an identifier of the second device, the first device is connected to the first access point, and the second device is connected to the second access point;

sending, by the second access point, the D2D connection request to the second device based on the identifier of the second device;

receiving, by the second access point, a D2D connection request response returned from the second device, wherein the D2D connection request response carries a channel resource available for both the first device and the second device and the identifier of the first device; and sending, by the second access point, the D2D connection request response to the first device via the first access point.

In a fourth aspect, still another resource negotiation method for D2D communication is provided, which includes:

receiving, by a first access point, a D2D connection request sent by a first device, where in the D2D connection request is for requesting an establishment of a D2D communication between the first device and a second device, the D2D connection request carries an available channel resource of the first device, an identifier of the first device and an identifier of the second device, the first device is connected to the first access point, and the second device is connected to a second access point;

sending, by the first access point, the D2D connection request to the second access point;

receiving, by the first access point, a D2D connection request response returned from the second access point, wherein the D2D connection request response carries a channel resource available for both the first device and the second device and the identifier of the first device; and sending, by the first access point, the D2D connection request response to the first device.

In a fifth aspect, a second base station is provided, which includes a first obtaining module, a resource allocation module and a first notifying module which are connected with each other, where the first obtaining module is configured to obtain an available channel resource of a first device and provide the available channel resource of the first device to the resource allocation module, wherein the first device is connected to a first base station;

the resource allocation module is configured to allocate a D2D communication resource for a D2D communication between the first device and a second device based on an available channel resource of the second device connected to the second base station and the available channel resource of the first device, and provide the allocated D2D communication resource to the first notifying module; and the first notifying module is configured to notify the second device of the allocated D2D communication resource and notify the first device of the allocated D2D communication resource via the first base station.

A first possible implementation way of the fifth aspect further includes:

a second obtaining module, which is connected to the resource allocation module and is configured to obtain the available channel resource of the second device and send the available channel resource of the second device to the resource allocation module.

Combining with the fifth aspect or the first possible implementation way of the fifth aspect, in a second possible implementation way, the first obtaining module includes:

a receiving unit, configured to receive the available channel resource of the first device sent by the first base station.

Combining with the fifth aspect or the first possible implementation way of the fifth aspect, in a third possible implementation way, the first obtaining module includes:

an obtaining unit, configured to send an available channel list querying request carrying an identifier of the first device and an identifier of the second device to a database and receive an available channel list of the first device and an available channel list of the second device returned from the database.

Combining with the third possible implementation way of the fifth aspect, a fourth possible implementation way further includes a first D2D connection request receiving module or a first handoff determining module, where the first D2D connection request receiving module is configured to receive a D2D connection request sent by a core network, wherein the D2D connection request carries an identifier of the first base station, an identifier of the second base station, the identifier of the first device and the identifier of the second device; and the first handoff determining module is configured to determine to perform a frequency point handoff of a D2D communication link between the first device and the second device.

In a sixth aspect, a first base station is provided, which includes a notification receiving module and a second notifying module which are connected to each other, where the notification receiving module is configured to receive a notification message which is sent by a second base station and is for indicating a D2D communication resource for a D2D communication between a first device and a second device, wherein the D2D communication resource is allocated by the second base station, the first device is connected to the first base station, and the second device is connected to the second base station; and the second notifying module is configured to notify the first device of the D2D communication resource.

A first possible implementation way of the sixth aspect further includes:

a sending module, configured to send an available channel resource of the first device to the second base station.

Combining with the first possible implementation way of the sixth aspect, a second possible implementation way further includes a second D2D connection request receiving module or a second handoff determining module, where the second D2D connection request receiving module is configured to receive a D2D connection request sent by a core network, wherein the D2D connection request carries an identifier of the first base station, an identifier of the second base station, an identifier of the first device and an identifier of the second device; and the second handoff determining module is configured to determine to perform a frequency point handoff of a D2D communication link between the first device and the second device.

In a seventh aspect, a second access point is provided, which includes:

a first receiving module, configured to receive a D2D connection request from a first access point, wherein the D2D connection request is sent by a first device and is for requesting an establishment of a D2D communication between the first device and a second device, the D2D connection request carries an available channel resource of the first device, an identifier of the first device and an identifier of the second device, the first device is connected to the first access point, and the second device is connected to the second access point;

a first forwarding module, configured to send the D2D connection request to the second device based on the identifier of the second device;

a second receiving module, configured to receive a D2D connection request response returned from the second device, wherein the D2D connection request response carries a channel resource available for both the first device and the second device and the identifier of the first device; and a second forwarding module, configured to send the D2D connection request response to the first device via the first access point.

In an eighth aspect, a first access point is provided, which includes:

a third receiving module, configured to receive a D2D connection request sent by a first device, wherein the D2D connection request is for requesting an establishment of a D2D communication between the first device and a second device, the D2D connection request carries an available channel resource of the first device, an identifier of the first device and an identifier of the second device, the first device is connected to the first access point, and the second device is connected to a second access point;

a third forwarding module, configured to send the D2D connection request to the second access point;

a fourth receiving module, configured to receive a D2D connection request response returned from the second access point, wherein the D2D connection request response carries a channel resource available for both the first device and the second device and the identifier of the first device; and a fourth forwarding module, configured to send the D2D connection request response to the first device.

In a ninth aspect, a resource negotiation system for D2D communication is provided, which includes the second base station according to the embodiments of the present disclosure, the first base station according to according to the embodiments of the present disclosure, a second device connected to the second base station and a first device connected to the first base station.

In a tenth aspect, a resource negotiation system for D2D communication is provided, which includes the second access point according to the embodiments of the present disclosure, the first access point according to the embodiments of the present disclosure, a second device connected to the second access point and a first device connected to the first access point.

With the resource negotiation method, the device and the system for D2D communication according to the embodiments of the present disclosure, since the second base station obtains the available channel resource of the first device that is not connected to the second base station and can obtain the available channel resource of the second device connected to the second base station, the second base station allocates the D2D communication resource to the first device and the second device based on the available channel resource of the first device and the available channel resource of the second device, notifies the first device of the allocated D2D communication resource via the first base station connected to the first device, and notifies the second device of the allocated D2D communication resource via the connection between the second base station and the second device, thereby completing a procedure of resource negotiation for D2D communication. Therefore, the resource negotiation for D2D communication between devices served by different base stations is performed successfully and effectively to establish the D2D communication between the devices served by different base stations.

BRIEF DESCRIPTION OF THE DRAWINGS

The accompanying drawings needed to be used in the description of embodiments or conventional technology are described briefly hereinafter to further clarify technical solutions of the embodiments of the present disclosure or technical solutions of the conventional technology. It is obvious that the accompanying drawings in the following description are only for some embodiments of the present disclosure. For those skilled in the art, other accompanying drawings may be obtained based on these accompanying drawings without any creative work.

DETAILED DESCRIPTION OF THE EMBODIMENTS

In the following embodiments of the present disclosure, a resource negotiation method for D2D communication is illustrated with an exemplary scene where two sides to establish a D2D communication are connected to different base stations or different access points. It is assumed that the two sides to establish the D2D communication are a first device and a second device, the first device is connected to a first base station/a first access point, and the second device is connected to a second base station/a second access point. The first device/the first base station/the first access point and the second device/the second base station/the second access point are relative concepts. That is, in the following embodiments of the present disclosure, the first device and the second device are interchangeable, the first base station and the second base station are interchangeable, and the first access point and the second access point are interchangeable. A person skilled in the art may understand that, technical solutions of the present disclosure may also be implemented in a case that the first base station/the first access point and the second base station/the second access point are the same base station/the same access point, i.e., the technical solutions in the following embodiments of the present disclosure are also applicable for resource negotiation for D2D communication between devices served by the same base station/the same access point.

Embodiment 1

Figure 1:
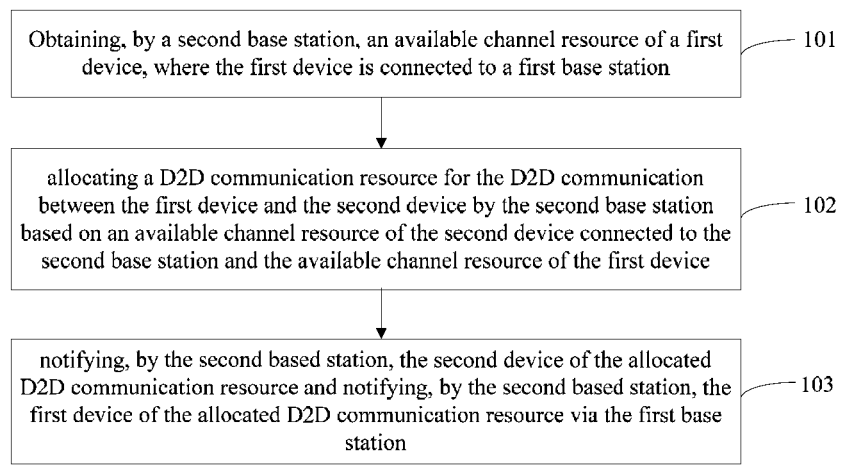
FIG. 1 is a schematic flowchart of a resource negotiation method for D2D communication according to an embodiment of the present disclosure.

FIG. 1 is a schematic flowchart of a resource negotiation method for D2D communication according to an embodiment of the present disclosure. As shown in FIG. 1, the method includes steps as follows.

101, obtaining an available channel resource of a first device by a second base station, where the first device is connected to a first base station.

Specifically, the second base station obtains the available channel resource of the first device when a resource negotiation for a D2D communication between the first device and a second device is initiated. The second base station may passively obtain the available channel resource of the first device by, for example, may receive the available channel resource of the first device sent by the first base station. Alternatively, the second base station may actively obtain the available channel resource of the first device, for example, the second base station may obtain by querying a database (DB) or by sending a corresponding request to the first base station. The available channel resource includes, for example, a time slot, a frequency point, a permitted maximum transmitting power, and so on.

102, allocating a D2D communication resource for the D2D communication between the first device and the second device by the second base station based on an available channel resource of the second device connected to the second base station and the available channel resource of the first device.

Specifically, the second base station selects, based on the available channel resource of the second device and the available channel resource of the first device, a channel resource available for both the first device and the second device as an allocated D2D communication resource. Furthermore, if there are multiple channel resources that are available for both the first device and the second device, the second base station may further take a condition of interference into consideration to allocate, for the two devices, a communication resource for a D2D connection. The allocated channel resource includes a time slot, a frequency point, a permitted maximum transmitting power, or the like.

103, notifying, by the second based station, the second device of the allocated D2D communication resource and notifying, by the second based station, the first device of the allocated D2D communication resource via the first base station.

Specifically, the second base station directly sends the allocated D2D communication resource to the second device and sends the allocated D2D communication resource to the first base station, the first base station forwards the allocated D2D communication resource to the first device, and accordingly, both sides of the D2D communication acquire currently allocated D2D communication resource and perform the D2D communication based on the D2D communication resource.

With the resource negotiation method for D2D communication according to the embodiment, the second base station obtains the available channel resource of the first device that is not connected to the second base station and the second base station can obtain the available channel resource of the second device connected to the second base station. Thus, the second base station allocates the D2D communication resource to the first device and the second device based on the available channel resource of the first device and the available channel resource of the second device, notifies the first device of the allocated D2D communication resource via the first base station connected to the first device, and notifies the second device of the allocated D2D communication resource via a connection between the second base station and the second device, thereby completing a procedure of resource negotiation for D2D communication. Therefore, the resource negotiation for D2D communication between devices served by different base stations is implemented successfully and effectively to establish the D2D communication between the devices served by different base stations.

Embodiment 2

Figure 2:
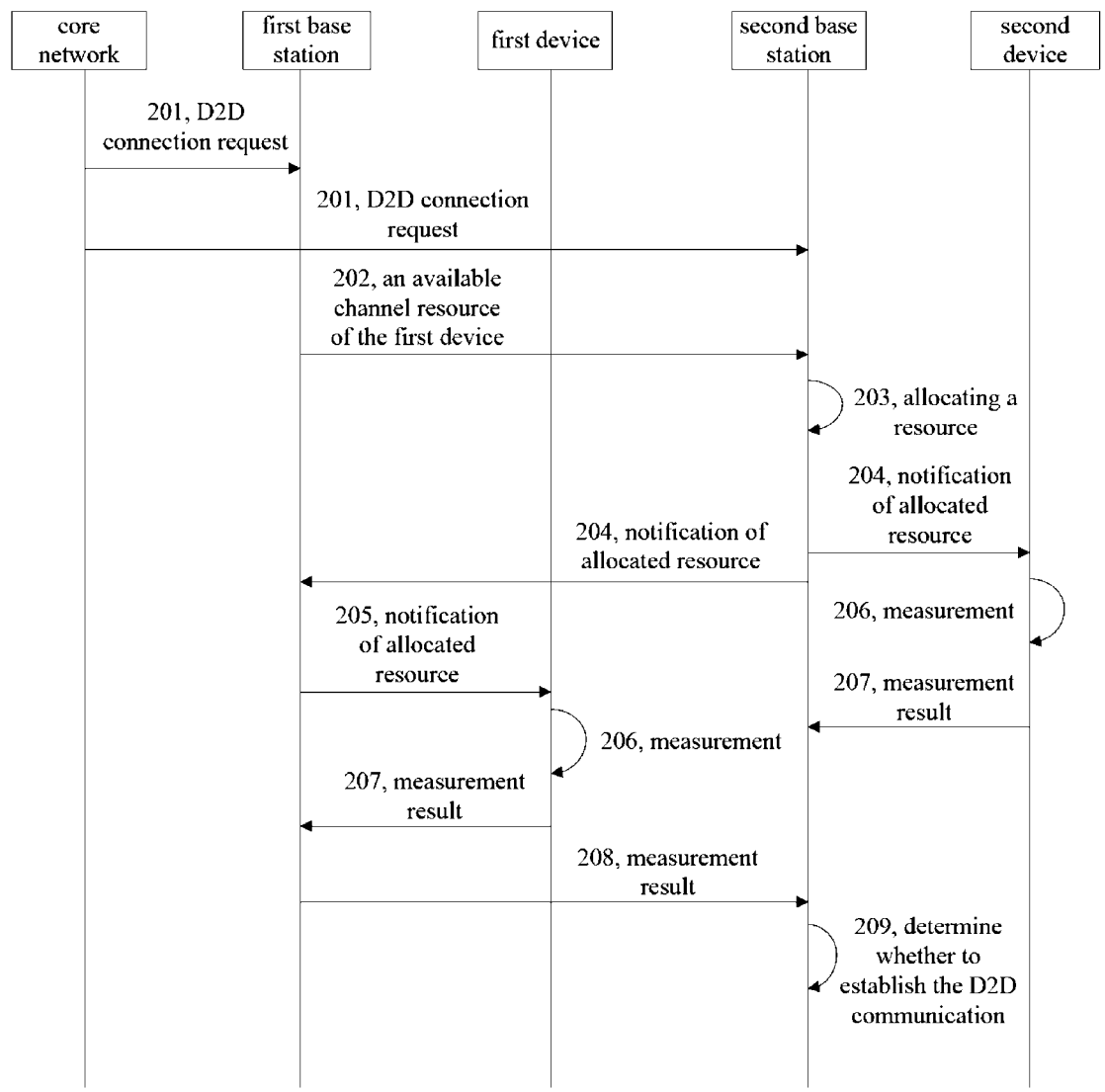
FIG. 2 is a signaling diagram of a resource negotiation method for D2D communication according to another embodiment of the present disclosure.

FIG. 2 is a signaling diagram of a resource negotiation method for D2D communication according to another embodiment of the present disclosure. As shown in FIG. 2, the method includes:

201, a core network sends a D2D connection request to a first base station and a second base station.

Specifically, the D2D connection request carries an identifier of the first base station, an identifier of the second base station, an identifier of a first device and an identifier of a second device. The embodiment is not limited regarding a triggering condition for sending the D2D connection request by the core network. For example, if the core network detects that a communication being performed between the first device and the second device via the core network has an exceeding data amount and the load of the core network side is increased greatly, the core network may send the D2D connection request to the base stations corresponding to the first and second devices to change a data communication between the first and second devices into a D2D communication, thereby reducing the load of the core network side.

202, sending an available channel resource of the first device to the second base station by the first base station.

Specifically, in the embodiment, it is assumed that the first base station already knows the available channel resource of the first device and the second base station already knows an available channel resource of the second device.

203, allocating a resource for the D2D communication by the second base station based on the received available channel resource of the first device and the available channel resource of the second device.

204, notifying, by the second base station, the second device and the first base station of a channel resource allocated for the D2D communication.

205, notifying, by the first base station, the first device of the received channel resource allocated for the D2D communication.

206, performing measurements on the allocated channel resource, by the first and second devices.

Specifically, the first and second devices measure a channel quality of a D2D communication performed with the allocated channel resource, such as interference or path loss. The first and second devices may measure with any existing method for measuring the channel quality.

207, feeding back a measurement result to the first base station by the first device and feeding back a measurement result to the second base station by the second device.

Specifically, the first and second devices feed back the measurement results to the second base station that allocates the resource, and the second base station determines whether the currently allocated channel resource is to be used to establish the D2D communication between the first and second devices.

208, sending the measurement result, which is fed back from the first device, to the second base station by the first base station.

209, determining, by the second base station based on the measurement results fed back from the first and second devices, whether to establish the D2D communication.

Specifically, the second base station determines whether to establish a D2D connection, based on results of the measurements performed on the currently allocated channel resource by the first and second devices. For example, although the channel resource allocated by the second base station is available for both the first and second devices, the measurement results of the first and second devices both indicate that communication can not be performed since the first device is far away from the second device, and accordingly, the second base station determines not to establish the D2D communication.

If the second base station determines to establish the D2D communication, notification messages for indicating the two devices to perform the D2D communication with the currently allocated channel resource may be respectively sent to the first and second devices. If the second base station determines not to establish the D2D communication, notification messages for indicating that the D2D communication between the two devices can not be established may be sent to the first and second devices and the core network, to terminate the procedure of resource negotiation for the D2D communication; or steps 203 to 209 may be repeated to reallocate D2D communication resource until it is determined that a D2D connection can be established; or it is detected in step 203 that no channel resource is allocatable for the D2D communication.

With the resource negotiation method for D2D communication according to the embodiment, devices served by different base stations perform successfully the resource negotiation for the D2D communication and establish the D2D communication in the case that the D2D communication is triggered by the core network, the loads of the core network side and the base stations are reduced effectively, and the resource utilization rate and the network capacity are improved.

Embodiment 3

Figure 3:
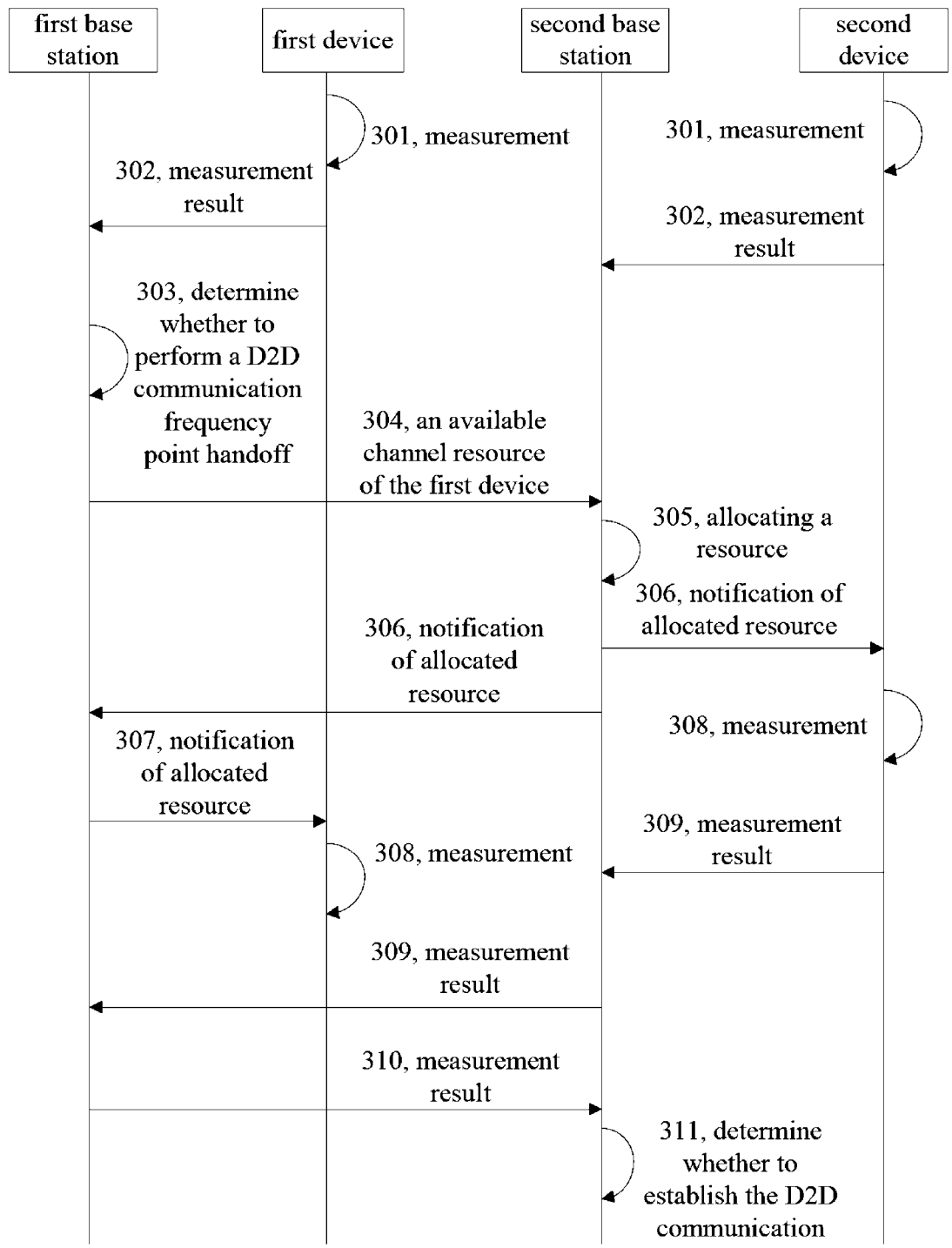
FIG. 3 is a signaling diagram of a resource negotiation method for D2D communication according to another embodiment of the present disclosure.

FIG. 3 is a signaling diagram of a resource negotiation method for D2D communication according to another embodiment of the present disclosure. As shown in FIG. 3, the method includes:

301, a first device and a second device, which are performing a D2D communication, measure a current D2D channel quality.

302, feeding back a measurement result to a first base station by the first device and feeding back a measurement result to a second base station by the second device.

303, determining, by the first base station based on the received measurement result, whether to perform a D2D communication frequency point handoff.

A specific way of determination is, for example, comparing the D2D channel quality indicated by the measurement result with a preset D2D channel quality; determining not to perform the D2D communication frequency point handoff if the D2D channel quality indicated by the measurement result is the same as or better than the preset D2D channel quality; or determining to perform the D2D communication frequency point handoff if the D2D channel quality indicated by the measurement result is worse than the preset D2D channel quality. In the embodiment, subsequent explanations are given on the basis of an example that a frequency point handoff determination is performed by the first base station and a determination result is to perform the D2D communication frequency point handoff. Alternatively, the second base station may determine whether to perform the D2D communication frequency point handoff, or the first and second base stations may determine whether to perform the D2D communication frequency point handoff, which are described in detail with subsequent embodiments.

304, sending an available channel resource of the first device to the second base station, by the first base station.

305, allocating a D2D communication resource by the second base station based on the received available channel resource of the first device and an available channel resource of the second device.

306, notifying, by the second base station, the second device and the first base station of a channel resource allocated for the D2D communication.

307, notifying, by the first base station, the first device of the received channel resource allocated for the D2D communication.

308, performing measurements on the allocated channel resource, by the first and second devices.

Specifically, the first and second devices measure a channel quality of a D2D communication performed with the allocated channel resources, such as interference or path loss. The first and second devices may measure with any existing method for measuring the channel quality.

309, feeding back a measurement result to the first base station by the first device and feeding back a measurement result to the second base station by the second device.

Specifically, the first and second devices feed back the measurement results to the second base station that allocates the resource, and the second base station determines whether the currently allocated channel resource is to be used to establish the D2D communication between the first and second devices.

310, sending the measurement result, which is fed back from the first device, to the second base station by the first base station.

311, determining, by the second base station based on the measurement results fed back from the first and second devices, whether to establish the D2D communication.

Detailed processes of the above steps 304 to 311 are same as those of steps 202 to 209 of the embodiment 2, which are consequently not repeated herein.

With the resource negotiation method for D2D communication according to the embodiment, the resource negotiation for D2D communication, which is triggered by a determination of performing the D2D communication frequency point handoff, is implemented, where the determination is made by the base station. That is, the procedure of the resource negotiation for D2D communication according to the embodiment of the disclosure is applicable not only to a procedure of establishing a new D2D communication but also to a procedure of a reestablishment/handoff of the D2D communication. In this way, the resource negotiation for D2D communication may be performed again based on current channel resources when the channel resource for the D2D communication changes, for example, when the channel quality becomes worse, thereby guaranteeing the quality of the D2D communication effectively.

Embodiment 4

In the embodiment, a procedure of a resource negotiation for D2D communication is explained on the basis of an example that television white space (TVWS) is applied as resources for the D2D communication and each base station already knows available channel lists sent by a database to respective devices connected to the base station.

Figure 4:
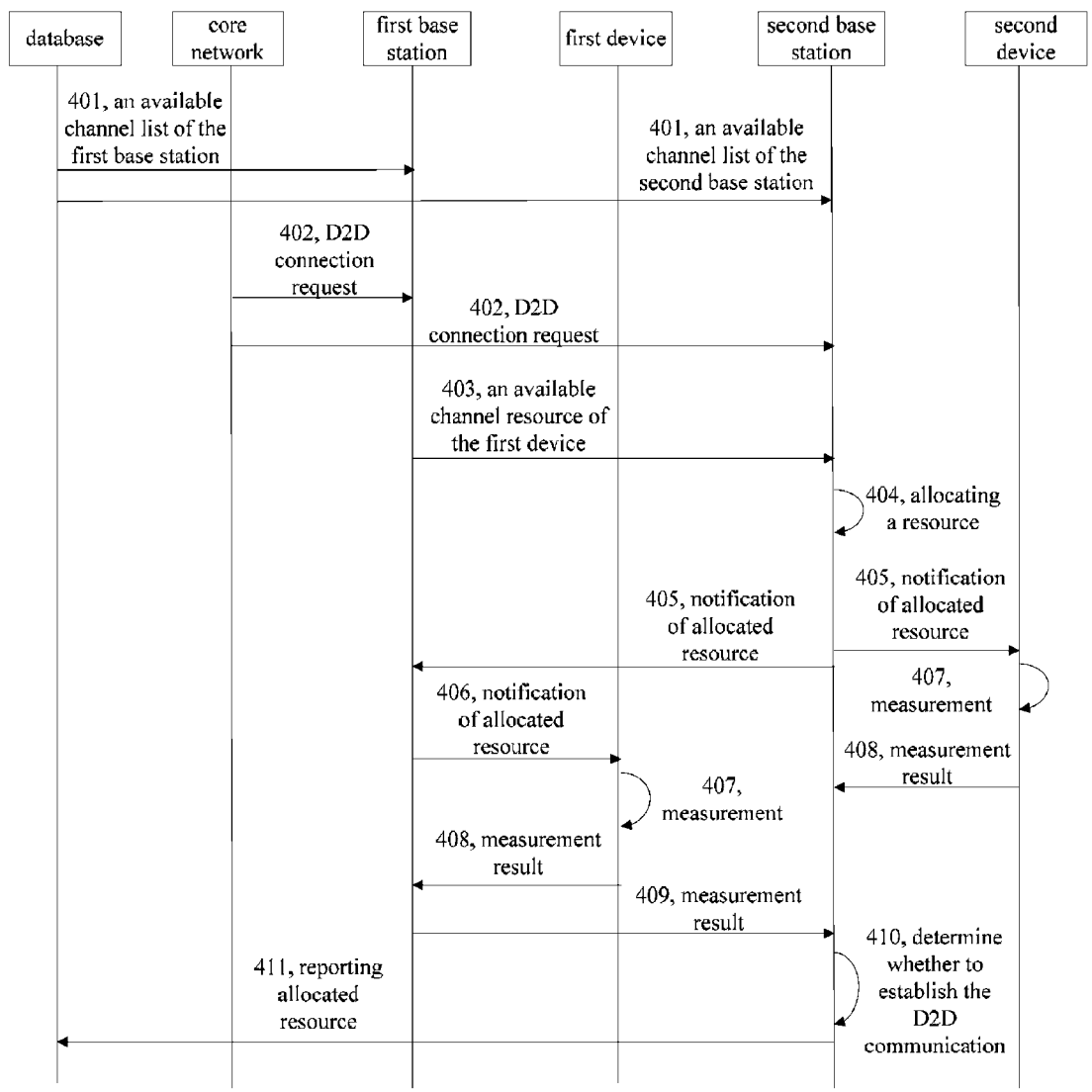
FIG. 4 is a signaling diagram of a resource negotiation method for D2D communication according to another embodiment of the present disclosure.

FIG. 4 is a signaling diagram of a resource negotiation method for D2D communication according to another embodiment of the present disclosure. As shown in FIG. 4, the method includes:

401, a database sends an available channel list of a first base station to the first base station and sends an available channel list of a second base station to the second base station.

Specifically, if a wireless device needs to use TVWS, the wireless device needs to apply an available channel list to a database authorized by a legal organization. The database sends different available channel lists to different base stations/different devices, which may be associated with the locations of individual base stations/devices. The available channel list is defined by the database and includes an available frequency point, an available bandwidth, a maximum transmitting power, a maximum power spectrum density, channel effective time, and the like.

402, sending a D2D connection request to the first base station and the second base station by a core network.

403, sending an available channel list of a first device to the second base station by the first base station.

Specifically, the database sends the available channel list of the first device to the first device in advance and sends an available channel list of a second device to the second device in advance. Here, it is assumed that the first base station already knows the available channel list of the first device and the second base station already knows the available channel list of the second device.

404, allocating a resource for the D2D communication by the second base station based on the received available channel list of the first device and the available channel list of the second device.

405, notifying, by the second base station, the second device and the first base station of a channel resource allocated for the D2D communication.

406, notifying, by the first base station, the first device of the received channel resource allocated for the D2D communication.

407, performing measurements on the allocated channel resource, by the first and second devices.

408, feeding back a measurement result to the first base station by the first device and feeding back a measurement result to the second base station by the second device.

409, sending the measurement result, which is fed back from the first device, to the second base station by the first base station.

410, determining, by the second base station based on the measurement results fed back from the first and second devices, whether to establish the D2D communication.

Specifically, step 411 is performed if the determination is positive, or the resource negotiation is performed again or establishment of the D2D communication is terminated based on a preset rule if the determination is negative.

411, reporting the allocated D2D communication resource to the database by the second base station and performing a database update by the database based on the D2D communication resource.

Detailed processes of the above steps 405 to 410 are same as those of steps 204 to 209 of the embodiment 2, which are consequently not repeated herein.

With the resource negotiation method for D2D communication according to the embodiment, devices served by different base stations perform the resource negotiation for D2D communication successfully in the case that TVWS is applied as resources for the D2D communication, and TVWS resources are used to perform the D2D communication.

Embodiment 5

In the embodiment, a procedure of a resource negotiation for D2D communication is explained on the basis of an example that TVWS is applied as resources for the D2D communication and each base station does not know available channel lists sent by a database to respective devices connected to the base station.

Figure 5:
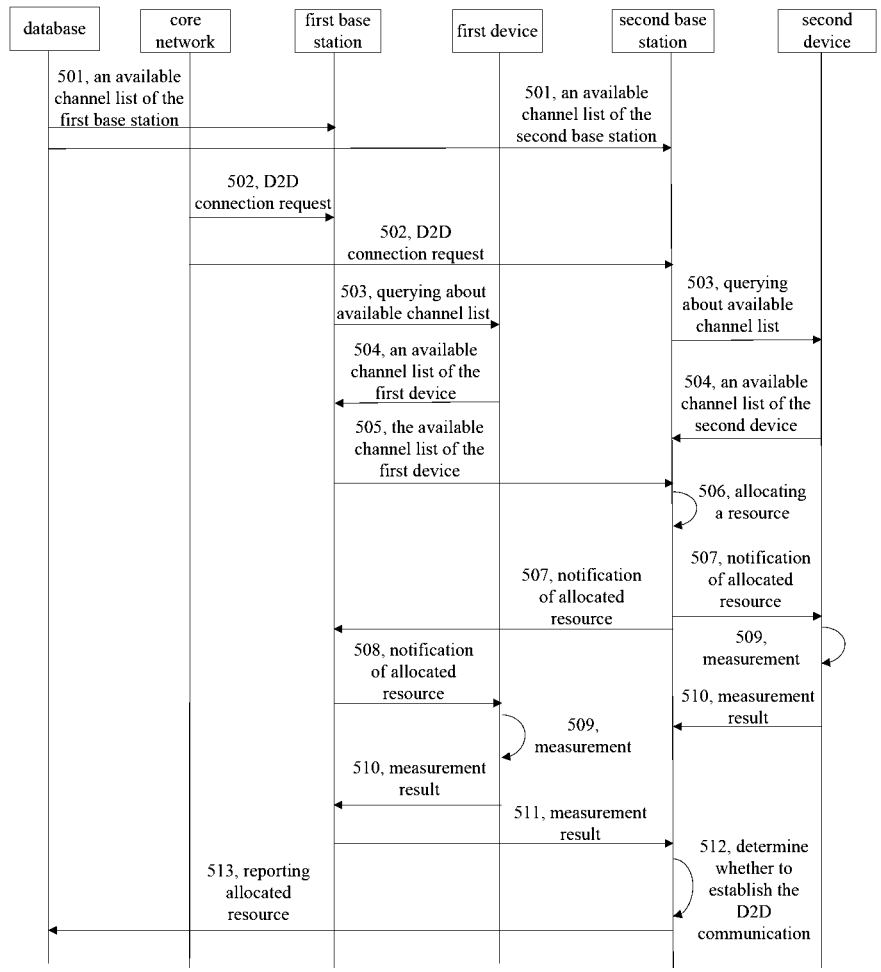
FIG. 5 is a signaling diagram of a resource negotiation method for D2D communication according to another embodiment of the present disclosure.

FIG. 5 is a signaling diagram of a resource negotiation method for D2D communication according to another embodiment of the present disclosure. As shown in FIG. 5, the method includes:

501, a database sends an available channel list of a first base station to the first base station and sends an available channel list of a second base station to the second base station.

502, sending a D2D connection request to the first base station and the second base station by a core network.

503, querying a first device about an available channel list of the first device by the first base station and querying a second device about an available channel list of the second device by the second base station.

Specifically, the database sends the available channel list of the first device to the first device in advance and sends the available channel list of the second device to the second device in advance.

504, returning the available channel list of the first device to the first base station by the first device and returning the available channel list of the second device to the second base station by the second device.

505, sending the available channel list of the first device to the second base station by the first base station.

506, allocating a resource for the D2D communication by the second base station based on the received available channel list of the first device and the available channel list of the second device.

507, notifying, by the second base station, the second device and the first base station of a channel resource allocated for the D2D communication.

508, notifying, by the first base station, the first device of the received channel resource allocated for the D2D communication.

509, performing measurements on the allocated channel resource, by the first and second devices.

510, feeding back a measurement result to the first base station by the first device and feeding back a measurement result to the second base station by the second device.

511, sending the measurement result, which is fed back from the first device, to the second base station by the first base station.

512, determining, by the second base station based on the measurement results fed back from the first and second devices, whether to establish the D2D communication.

Specifically, step 513 is performed if the determination is positive, or the resource negotiation is performed again or establishment of the D2D communication is terminated based on a preset rule if the determination is negative.

513, reporting the allocated D2D communication resource to the database by the second base station and performing a database update by the database based on the D2D communication resource.

Detailed processes of the above steps 501 to 502 are same as those of steps 401 to 402 of the embodiment 4, and detailed processes of the above steps 505 to 513 are same as those of steps 403 to 411 of the embodiment 4, which are consequently not repeated herein.

With the resource negotiation method for D2D communication according to the embodiment, the devices served by different base stations perform the resource negotiation for D2D communication successfully in the scenario that TVWS is applied as resources for the D2D communication and each base station does not know available channel lists sent by the database to the respective devices connected to the base station, and TVWS resources are used to perform the D2D communication.

Embodiment 6

In the embodiment, a procedure of another resource negotiation for D2D communication is explained on the basis of an example that TVWS is applied as resources for the D2D communication and each base station does not know available channel lists sent by a database to respective devices connected to the base station.

Figure 6:
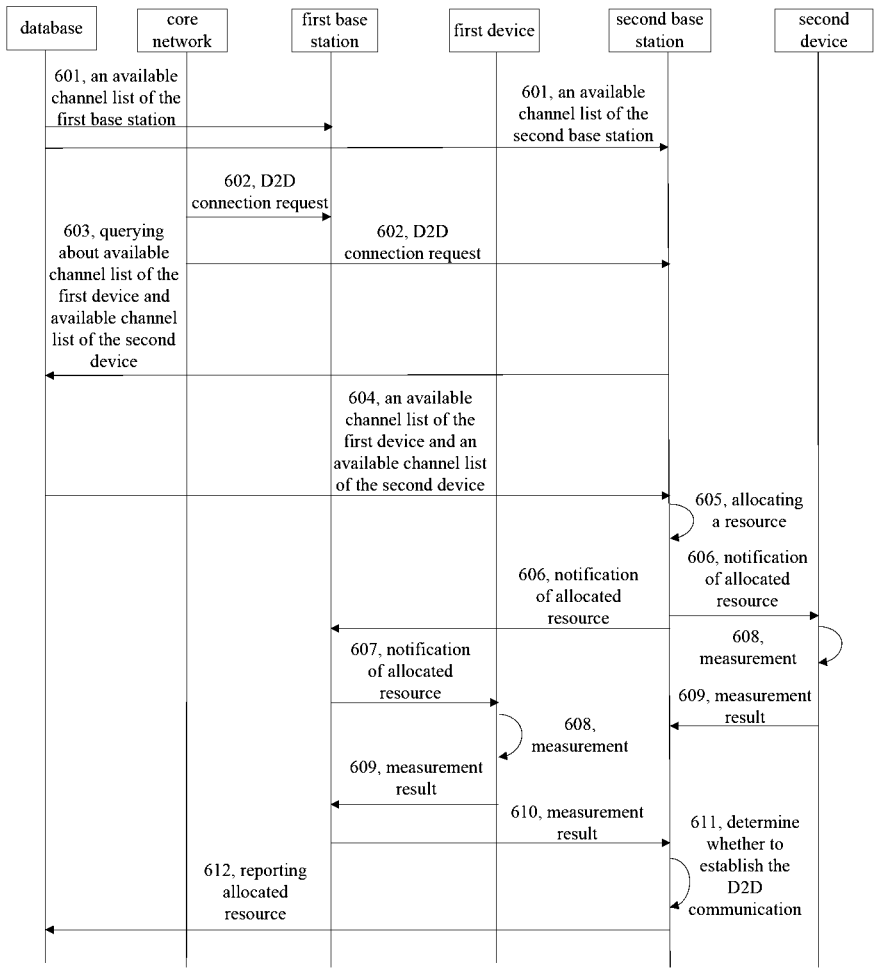
FIG. 6 is a signaling diagram of a resource negotiation method for D2D communication according to another embodiment of the present disclosure.

FIG. 6 is a signaling diagram of a resource negotiation method for D2D communication according to another embodiment of the present disclosure. As shown in FIG. 6, the method includes:

601, a database sends an available channel list of a first base station to the first base station and sends an available channel list of a second base station to the second base station.

602, sending a D2D connection request to the first base station and the second base station by a core network.

603, querying the database about an available channel list of a first device and an available channel list of a second device, by the second base station.

Specifically, the embodiment is explained with an example that the second base station obtains the available channel list of the first device and the available channel list of the second device by actively querying the database. For example, the second base station sends, to the database, an available channel list querying request carrying an identifier of the first device and an identifier of the second device. The available channel list querying request may apply any message format predetermined by the base station and the database, which is not limited in the embodiment.

604, returning the available channel list of the first device and the available channel list of the second device to the second base station by the database.

605, allocating a resource for the D2D communication by the second base station based on the received available channel list of the first device and the received available channel list of the second device.

606, notifying, by the second base station, the second device and the first base station of a channel resource allocated for the D2D communication.

607, notifying, by the first base station, the first device of the received channel resource allocated for the D2D communication.

608, performing measurements on the allocated channel resource, by the first and second devices.

609, feeding back a measurement result to the first base station by the first device and feeding back a measurement result to the second base station by the second device.

610, sending the measurement result, which is fed back from the first device, to the second base station by the first base station.

611, determining, by the second base station based on the measurement results fed back from the first and second devices, whether to establish the D2D communication.

Specifically, step 612 is performed if the determination is positive, or the resource negotiation is performed again or establishment of the D2D communication is terminated based on a preset rule if the determination is negative.

612, reporting the allocated D2D communication resource to the database by the second base station and performing a database update by the database based on the D2D communication resource.

Detailed processes of the above steps 601 to 602 are same as those of steps 501 to 502 of the embodiment 5, and detailed processes of the above steps 605 to 612 are same as those of steps 506 to 513 of the embodiment 5, which are consequently not repeated herein.

With the resource negotiation method for D2D communication according to the embodiment, the devices served by different base stations perform the resource negotiation for D2D communication successfully in the scenario that TVWS is applied as resources for the D2D communication and each base station does not know available channel lists sent by the database to the respective devices connected to the base station, and TVWS resources are used to perform the D2D communication.

Embodiment 7

In the embodiment, a procedure of a resource negotiation for D2D communication, which is performed based on a D2D communication frequency point handoff, is explained with a scenario where TVWS is applied as resources for the D2D communication and each base station already knows available channel lists sent by a database to respective devices connected to the base station.

Figure 7:
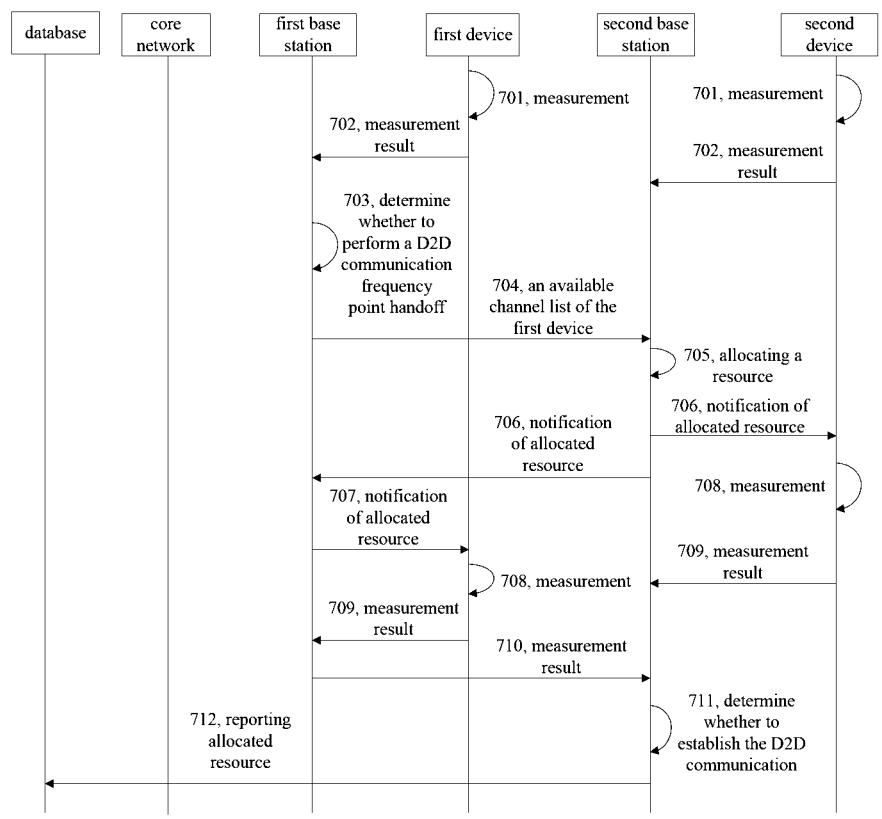
FIG. 7 is a signaling diagram of a resource negotiation method for D2D communication according to another embodiment of the present disclosure.

FIG. 7 is a signaling diagram of a resource negotiation method for D2D communication according to another embodiment of the present disclosure. As shown in FIG. 7, the method includes:

701, a first device and a second device which are performing a D2D communication measure a current D2D channel quality.

702, feeding back a measurement result to a first base station by the first device and feeding back a measurement result to a second base station by the second device.

703, determining, by the first base station and/or the second base station based on the received measurement results, whether to perform a D2D communication frequency point handoff.

In the embodiment, subsequent explanations are given on the basis of an example that a frequency point handoff determination is performed by the first base station and a determination result is to perform the D2D communication frequency point handoff.

704, sending an available channel resource of the first device to the second base station, by the first base station.

Specifically, a database sends the available channel list of the first device to the first device in advance and sends an available channel list of the second device to the second device in advance. Here, it is assumed that the first base station already knows the available channel list of the first device and the second base station already knows the available channel list of the second device.

705, allocating a D2D communication resource by the second base station based on the received available channel resource of the first device and the available channel resource of the second device.

706, notifying, by the second base station, the second device and the first base station of a channel resource allocated for the D2D communication.

707, notifying, by the first base station, the first device of the received channel resource allocated for the D2D communication.

708, performing measurements on the allocated channel resource, by the first and second devices.

709, feeding back a measurement result to the first base station by the first device and feeding back a measurement result to the second base station by the second device.

710, sending the measurement result, which is fed back from the first device, to the second base station by the first base station.

711, determining, by the second base station based on the measurement results fed back from the first and second devices, whether to establish the D2D communication.

Specifically, step 712 is performed if the determination is positive, or the resource negotiation is performed again or establishment of the D2D communication is terminated based on a preset rule if the determination is negative.

712, reporting the allocated D2D communication resource to the database by the second base station and performing a database update by the database based on the D2D communication resource.

Detailed processes of the above steps 701 to 703 are same as those of steps 301 to 303 of the embodiment 3, and detailed processes of the above steps 704 to 712 are same as those of steps 403 to 411 of the embodiment 4, which are consequently not repeated herein.

With the resource negotiation method for D2D communication according to the embodiment, devices served by different base stations perform the resource negotiation for D2D communication successfully based on the D2D communication frequency point handoff, in the case that TVWS is applied as resources for the D2D communication. In this way, the resource negotiation for D2D communication may be performed again based on current TVWS resources if the condition of a TVWS channel for the D2D communication is worse, thereby effectively guaranteeing the quality of the D2D communication.

Embodiment 8

In the embodiment, a procedure of a resource negotiation for D2D communication, which is performed based on a D2D communication frequency point handoff, is explained with a scenario where TVWS is applied as resources for the D2D communication and each base station does not know available channel lists sent by a database to respective devices connected to the base station.

Figure 8:
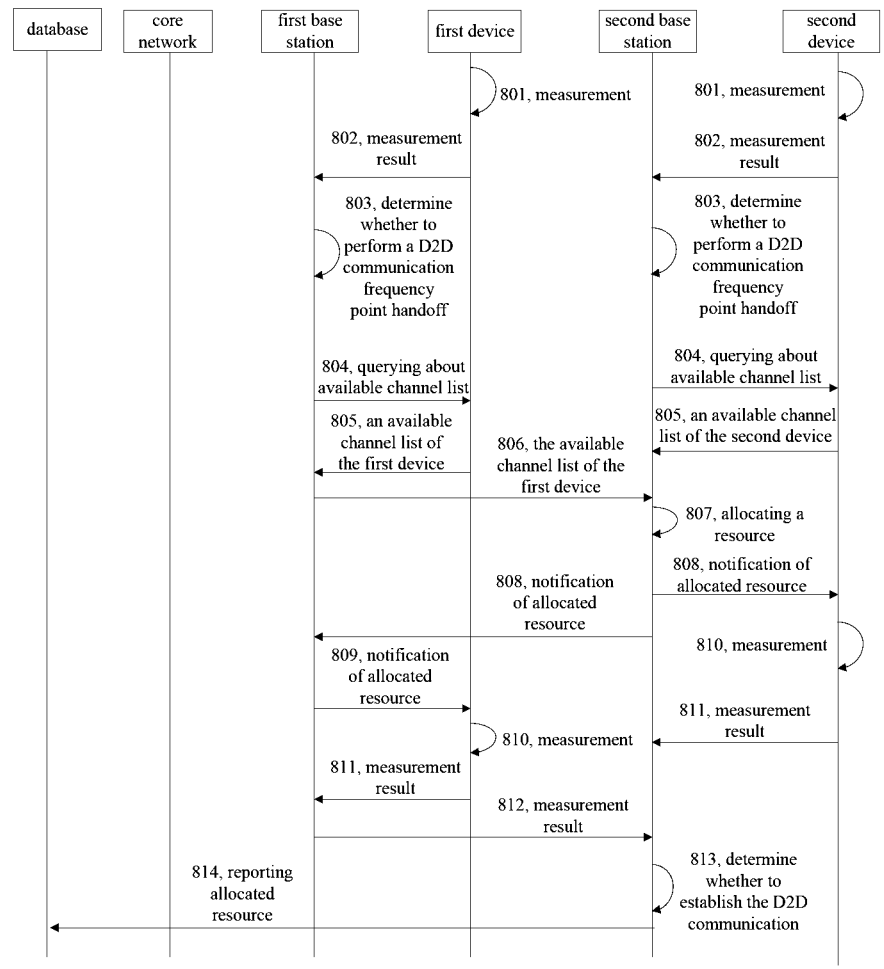
FIG. 8 is a signaling diagram of a resource negotiation method for D2D communication according to another embodiment of the present disclosure.

FIG. 8 is a signaling diagram of a resource negotiation method for D2D communication according to another embodiment of the present disclosure. As shown in FIG. 8, the method includes:

801, a first device and a second device which are performing a D2D communication measure a current D2D channel quality.

802, feeding back a measurement result to a first base station by the first device and feeding back a measurement result to a second base station by the second device.

803, determining, by the first base station and the second base station based on the received measurement results, whether to perform a D2D communication frequency point handoff.

Since the first and second devices both measure the current D2D channel quality, the determination result obtained by the first device and the determination result obtained by the second device are normally the same. In the embodiment, subsequent explanations are given on the basis of an example that both the determination result of the first device and the determination result of the second device are to perform the D2D communication frequency point handoff.

804, querying the first device about an available channel list of the first device by the first base station and querying the second device about an available channel list of the second device by the second base station.

805, returning the available channel list of the first device to the first base station by the first device and returning the available channel list of the second device to the second base station by the second device.

806, sending the available channel list of the first device to the second base station by the first base station.

807, allocating a resource for the D2D communication by the second base station based on the received available channel list of the first device and the available channel list of the second device.

808, notifying, by the second base station, the second device and the first base station of a channel resource allocated for the D2D communication.

809, notifying, by the first base station, the first device of the received channel resource allocated for the D2D communication.

810, performing measurements on the allocated channel resource, by the first and second devices.

811, feeding back a measurement result to the first base station by the first device and feeding back a measurement result to the second base station by the second device.

812, sending the measurement result, which is fed back from the first device, to the second base station by the first base station.

813, determining, by the second base station based on the measurement results fed back from the first and second devices, whether to establish the D2D communication.

Specifically, step 814 is performed if the determination is positive, or the resource negotiation is performed again or establishment of the D2D communication is terminated based on a preset rule if the determination is negative.

814, reporting the allocated D2D communication resource to the database by the second base station and performing a database update by the database based on the D2D communication resource.

Detailed processes of the above step 801 to 803 are same as those of steps 701 to 703 of the embodiment 7, detailed processes of the above steps 804 to 805 are same as those of steps 503 to 504 of the embodiment 5, and detailed processes of the above steps 806 to 814 are same as those of steps 704 to 712 of the embodiment 7, which are consequently not repeated herein.

With the resource negotiation method for D2D communication according to the embodiment, devices served by different base stations perform the resource negotiation for D2D communication successfully based on the D2D communication frequency point handoff, in the case that TVWS is applied as resources for the D2D communication. In this way, the resource negotiation for D2D communication may be performed again based on current TVWS resources if the condition of a TVWS channel for the D2D communication is worse, thereby effectively guaranteeing the quality of the D2D communication.

Embodiment 9

In the embodiment, a procedure of another resource negotiation for D2D communication, which is performed based on a D2D communication frequency point handoff, is explained with a scenario where TVWS is applied as resources for the D2D communication and each base station does not know available channel lists sent by a database to respective devices connected to the base station.

Figure 9:
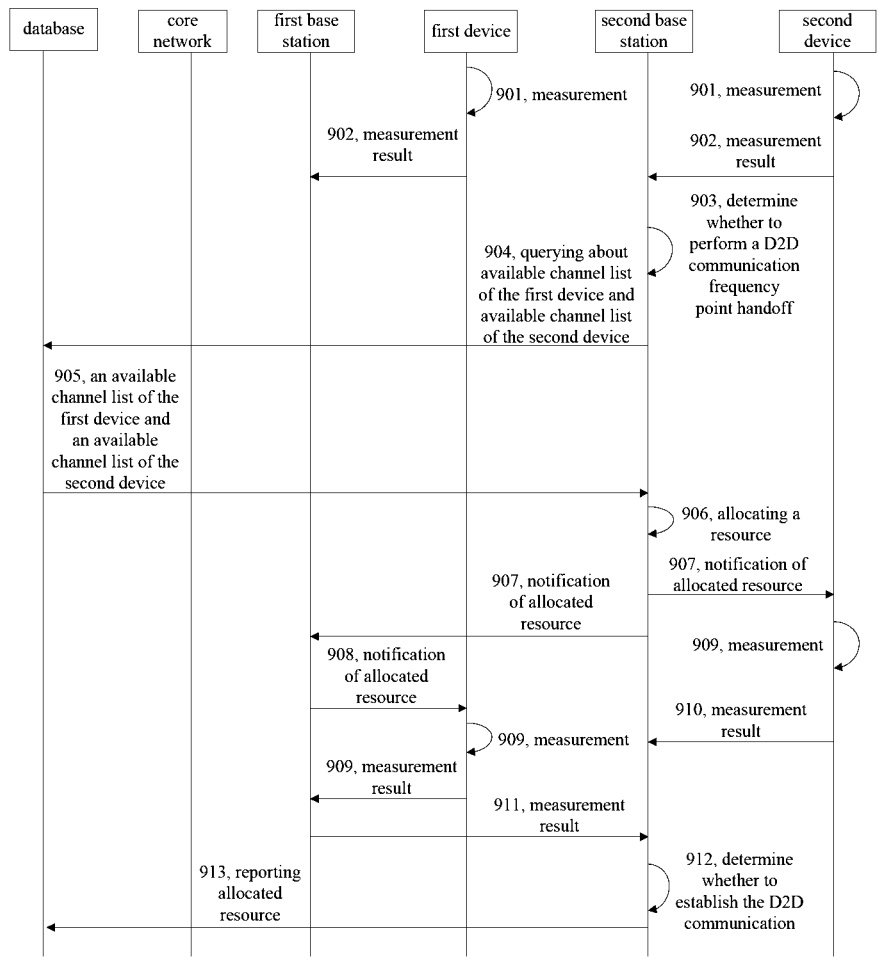
FIG. 9 is a signaling diagram of a resource negotiation method for D2D communication according to another embodiment of the present disclosure.

FIG. 9 is a signaling diagram of a resource negotiation method for D2D communication according to another embodiment of the present disclosure. As shown in FIG. 9, the method includes:

901, a first device and a second device which are performing D2D communication measure a current D2D channel quality.

902, feeding back a measurement result to a first base station by the first device and feeding back a measurement result to a second base station by the second device.

903, determining, by the second base station based on the received measurement result, whether to perform a D2D communication frequency point handoff.

In the embodiment, subsequent explanations are given on the basis of an example that a determination result of the second base station is to perform the D2D communication frequency point handoff.

904, querying a database about an available channel list of the first device and an available channel list of the second device, by the second base station.

905, returning the available channel list of the first device and the available channel list of the second device to the second base station by the database.

906, allocating a resource for the D2D communication by the second base station based on the received available channel list of the first device and the received available channel list of the second device.

907, notifying, by the second base station, the second device and the first base station of a channel resource allocated for the D2D communication.

908, notifying, by the first base station, the first device of the received channel resource allocated for the D2D communication.

909, performing measurements on the allocated channel resource, by the first and second devices.

910, feeding back a measurement result to the first base station by the first device and feeding back a measurement result to the second base station by the second device.

911, sending the measurement result, which is fed back from the first device, to the second base station by the first base station.

912, determining, by the second base station based on the measurement results fed back from the first and second devices, whether to establish the D2D communication.

Specifically, step 913 is performed if the determination is positive, or the resource negotiation is performed again or establishment of the D2D communication is terminated based on a preset rule if the determination is negative.

913, reporting the allocated D2D communication resource to the database by the second base station and performing a database update by the database based on the D2D communication resource.

Detailed processes of the above steps 901 to 903 are same as those of steps 801 to 803 of the embodiment 8, detailed processes of the above steps 904 to 905 are same as those of steps 603 to 604 of the embodiment 6, and detailed processes of the above steps 906 to 913 are same as those of steps 807 to 814 of the embodiment 8, which are consequently not repeated herein.

With the resource negotiation method for D2D communication according to the embodiment, devices served by different base stations perform the resource negotiation for D2D communication successfully based on the D2D communication frequency point handoff, in the case that TVWS is applied as resources for the D2D communication. In this way, the resource negotiation for D2D communication may be performed again based on current TVWS resources if the condition of a TVWS channel for the D2D communication is worse, thereby effectively guaranteeing the quality of the D2D communication.

Embodiment 10

A resource negotiation method for D2D communication according to the embodiment is applied to implement a procedure of a resource negotiation for a D2D communication performed by devices served by different access points in a WiFi scenario. The embodiment is illustrated with an example that a first device is a source device of the D2D communication and a second device is a target device of the D2D communication.

Figure 10:
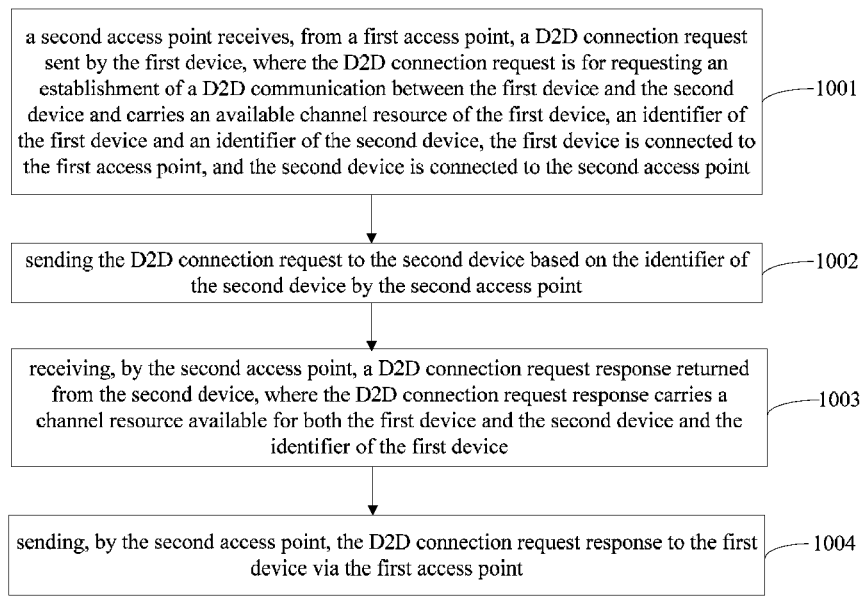
FIG. 10 is a schematic flowchart of a resource negotiation method for D2D communication according to another embodiment of the present disclosure.

FIG. 10 is a schematic flowchart of a resource negotiation method for D2D communication according to another embodiment of the present disclosure. As shown in FIG. 10, the method includes:

1001, a second access point receives, from a first access point, a D2D connection request sent by the first device, where the D2D connection request is for requesting an establishment of a D2D communication between the first device and the second device and carries an available channel resource of the first device, an identifier of the first device and an identifier of the second device, the first device is connected to the first access point, and the second device is connected to the second access point.

The available channel resource may be, for example, an available frequency resource.

1002, sending the D2D connection request to the second device based on the identifier of the second device by the second access point.

1003, receiving, by the second access point, a D2D connection request response returned from the second device, where the D2D connection request response carries a channel resource available for both the first device and the second device and the identifier of the first device.

Specifically, the second device returns the D2D connection request response to the second access point after receiving the D2D connection request forwarded by the second access point. The D2D connection request response includes, for example, a frequency resource available for both the first device and the second device, which is determined based on an available frequency resource of the first device and a frequency resource of the second device carried in the D2D connection request.

1004, sending, by the second access point, the D2D connection request response to the first device via the first access point.

Specifically, the first device determines a frequency point, which is for communicating with the second device, based on the frequency resources carried in the D2D connection request response after receiving the D2D connection request response.

With the resource negotiation method for D2D communication according to the embodiment, the second access point receives, via the first access point, the D2D connection request sent by the first device, forwards the D2D connection request to the second device connected to the second access point, and forwards the D2D connection request response to the first device via the first access point after receiving the D2D connection request response returned from the second device. Because the D2D connection request response carries the channel resource available for both the first and second devices, the first and second devices may determine a channel resource for a subsequent D2D communication, thereby completing a procedure of resource negotiation for D2D communication. Therefore, the resource negotiation for D2D communication between devices served by different access points is implemented successfully and effectively to establish the D2D communication between the devices served by the different access points.

Embodiment 11

A resource negotiation method for D2D communication according to the embodiment is described from the perspective of a first base station.

Figure 11:
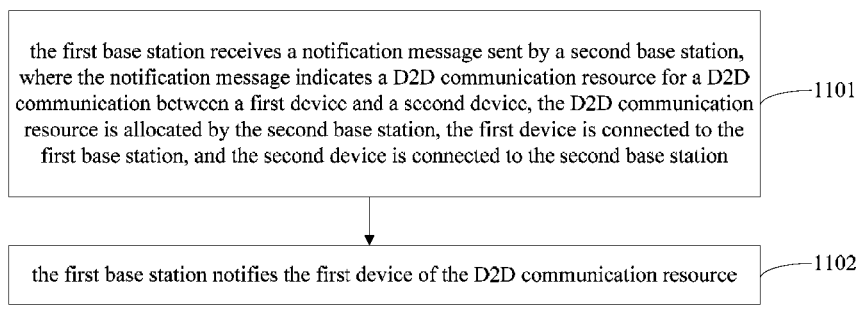
FIG. 11 is a schematic flowchart of a resource negotiation method for D2D communication according to another embodiment of the present disclosure.

FIG. 11 is a schematic flowchart of a resource negotiation method for D2D communication according to another embodiment of the present disclosure. As shown in FIG. 11, the method includes:

1101, the first base station receives a notification message sent by a second base station, where the notification message indicates a D2D communication resource for a D2D communication between a first device and a second device, the D2D communication resource is allocated by the second base station, the first device is connected to the first base station, and the second device is connected to the second base station; and 1102, the first base station notifies the first device of the D2D communication resource.

A detailed procedure of the resource negotiation method for D2D communication according to the embodiment is same as that of the embodiment 1, which is accordingly not repeated herein.

With the resource negotiation method for D2D communication according to the embodiment, the second base station allocates the D2D communication resource for the first and second devices, and the first base station receives the allocated D2D communication resource from the second base station and notifies the first device of the allocated D2D communication resource, thereby completing the procedure of resource negotiation for D2D communication. Therefore, the resource negotiation for D2D communication between devices served by different base stations is implemented successfully and effectively to establish the D2D communication between the devices served by different base stations.

Further, before the first base station receives the notification message which indicates the D2D communication resource for the D2D communication between the first device and the second device and is sent by the second base station, the resource negotiation method for D2D communication according to the embodiment further includes:

sending, by the first base station, an available channel resource of the first device to the second base station.

Further, before the first base station sends the available channel resource of the first device to the second base station, the resource negotiation method for D2D communication according to the embodiment further includes:

receiving, by the first base station, a D2D connection request sent by a core network, where the D2D connection request carries an identifier of the first base station, an identifier of the second base station, an identifier of the first device and an identifier of the second device; or determining, by the first base station, to perform a frequency point handoff of a D2D communication link between the first device and the second device.

Embodiment 12

A resource negotiation method for D2D communication according to the embodiment is described from the perspective of a first access point.

Figure 12:
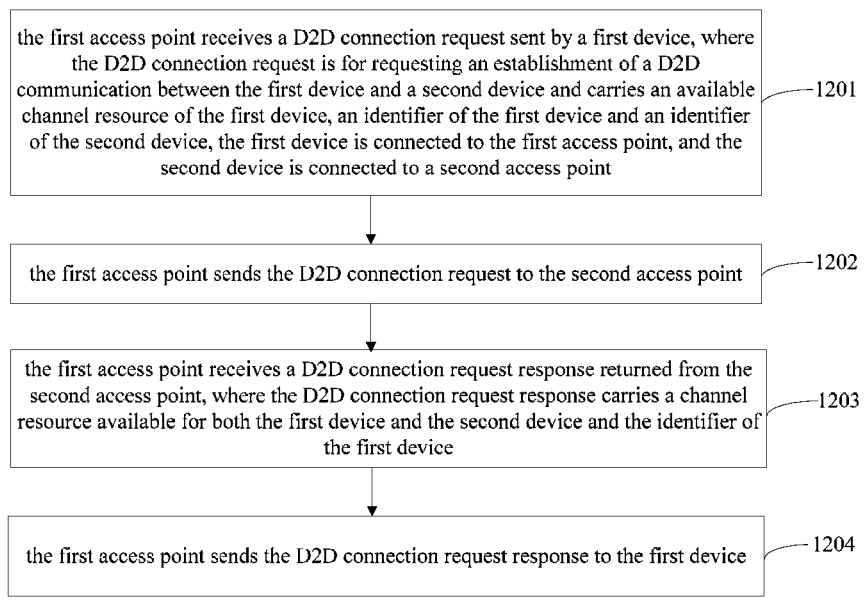
FIG. 12 is a schematic flowchart of a resource negotiation method for D2D communication according to another embodiment of the present disclosure.

FIG. 12 is a schematic flowchart of a resource negotiation method for D2D communication according to another embodiment of the present disclosure. As shown in FIG. 12, the resource negotiation method for D2D communication includes:

1201, the first access point receives a D2D connection request sent by a first device, where the D2D connection request is for requesting an establishment of a D2D communication between the first device and a second device and carries an available channel resource of the first device, an identifier of the first device and an identifier of the second device, the first device is connected to the first access point, and the second device is connected to a second access point;

1202, the first access point sends the D2D connection request to the second access point;

1203, the first access point receives a D2D connection request response returned from the second access point, where the D2D connection request response carries a channel resource available for both the first device and the second device and the identifier of the first device; and 1204, the first access point sends the D2D connection request response to the first device.

A detailed procedure of the resource negotiation method for D2D communication according to the embodiment is same as that of the embodiment 10, which is accordingly not repeated herein.

With the resource negotiation method for D2D communication according to the embodiment, the first access point receives the D2D connection request sent by the first device, forwards the D2D connection request to the second access point connected to the second device so that the D2D connection request is sent to the second device via the second access point, and forwards the D2D connection request response to the first device after receiving the D2D connection request response returned from the second device and sent by the second access point. Because the D2D connection request response carries the channel resource available for both the first and second devices, the first and second devices may determine a channel resource for a subsequent D2D communication, thereby completing the procedure of resource negotiation of D2D communication. Therefore, the resource negotiation for D2D communication between devices served by different access points is performed successfully and effectively to establish the D2D communication between the devices served by different access points.

Embodiment 13

Figure 13:
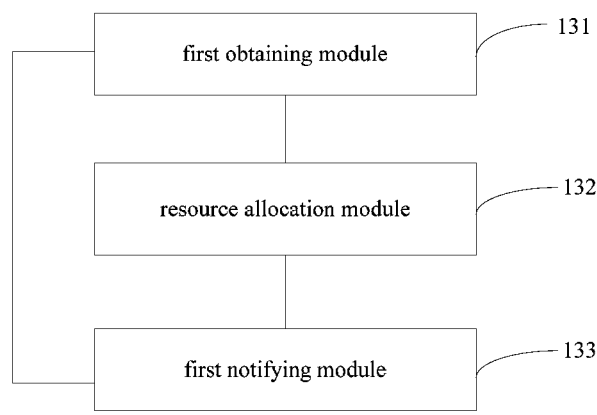
FIG. 13 is a schematic structural diagram of a second base station according to an embodiment of the present disclosure.

FIG. 13 is a schematic structural diagram of a second base station according to an embodiment of the present disclosure. As shown in FIG. 13, the second base station includes a first obtaining module 131, a resource allocation module 132 and a first notifying module 133 which are connected with each other.

The first obtaining module 131 is configured to obtain an available channel resource of a first device and send the available channel resource of the first device to the resource allocation module 132. The first device is connected to a first base station.

The resource allocation module 132 is configured to allocate a D2D communication resource for a D2D communication between the first device and a second device based on an available channel resource of the second device connected to the second base station and the available channel resource of the first device, and provide the allocated D2D communication resource to the first notifying module 133.

The first notifying module 133 is configured to notify the second device of the allocated D2D communication resource and notify the first device of the allocated D2D communication resource via the first base station.

A detailed procedure of the resource negotiation for D2D communication performed by the second base station is same as that in any one of the embodiments 1 to 9, which is accordingly not repeated herein.

Since the second base station according to the embodiment obtains the available channel resource of the first device that is not connected to the second base station and the second base station can obtain the available channel resource of the second device connected to the second base station, the second base station allocates the D2D communication resource to the first device and the second device based on the available channel resource of the first device and the available channel resource of the second device, notifies the first device of the allocated D2D communication resource via the first base station connected to the first device, and notifies the second device of the allocated D2D communication resource via a connection between the second base station and the second device, thereby completing a procedure of resource negotiation for D2D communication. Therefore, the resource negotiation for D2D communication between devices served by different base stations is performed successfully and effectively to establish the D2D communication between the devices served by different base stations.

Further, the second base station according to the embodiment further includes:

a second obtaining module connected to the resource allocation module and configured to obtain the available channel resource of the second device and provide the available channel resource of the second device to the resource allocation module.

Further, in the second base station according to the embodiment, the first obtaining module includes:

a receiving unit, configured to receive the available channel resource of the first device sent by the first base station.

Further, in the second base station according to the embodiment, the first obtaining module includes:

an obtaining unit configured to send, to a database, an available channel list querying request carrying an identifier of the first device and an identifier of the second device and receive an available channel list of the first device and an available channel list of the second device returned from the database.

Further, the second base station according to the embodiment further includes a first D2D connection request receiving module or a first handoff determining module.

The first D2D connection request receiving module is configured to receive a D2D connection request sent by a core network, where the D2D connection request carries an identifier of the first base station, an identifier of the second base station, the identifier of the first device and the identifier of the second device.

The first handoff determining module is configured to determine to perform a frequency point handoff of a D2D communication link between the first device and the second device.

Embodiment 14

Figure 14:
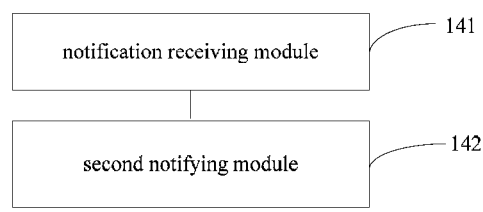
FIG. 14 is a schematic structural diagram of a first base station according to an embodiment of the present disclosure.

FIG. 14 is a schematic structural diagram of a first base station according to an embodiment of the present disclosure. As shown in FIG. 14, the first base station includes a notification receiving module 141 and a second notifying module 142 which are connected to each other.

The notification receiving module 141 is configured to receive a notification message sent by a second base station, the notification message is for indicating a D2D communication resource for a D2D communication between a first device and a second device, the D2D communication resource is allocated by the second base station, the first device is connected to the first base station, and the second device is connected to the second base station.

The second notifying module 142 is configured to notify the first device of the D2D communication resource.

A detailed procedure of the resource negotiation for D2D communication performed by the first base station is same as that in the embodiment 11, which is accordingly not repeated herein.

The first base station according to the embodiment receives the D2D communication resource for the first and second devices allocated by the second base station and notifies the first device of the allocated D2D communication resource, thereby completing the procedure of resource negotiation for D2D communication. Therefore, the resource negotiation for D2D communication between devices served by different base stations is performed successfully and effectively to establish the D2D communication between the devices served by different base stations.

Further, the first base station according to the embodiment includes:

a sending module, configured to send an available channel resource of the first device to the second base station.

Further, the first base station according to the embodiment includes a second D2D connection request receiving module or a second handoff determining module.

The second D2D connection request receiving module is configured to receive a D2D connection request sent by a core network. The D2D connection request carries an identifier of the first base station, an identifier of the second base station, an identifier of the first device and an identifier of the second device.

The second handoff determining module is configured to determine to perform a frequency point handoff of a D2D communication link between the first device and the second device.

Embodiment 15

Figure 15:
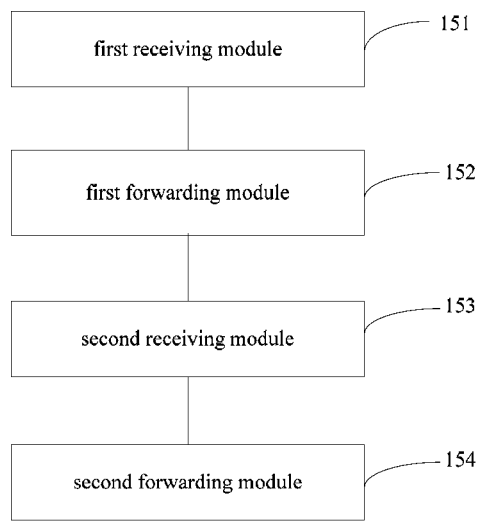
FIG. 15 is a schematic structural diagram of a second access point according to an embodiment of the present disclosure.

FIG. 15 is a schematic structural diagram of a second access point according to an embodiment of the present disclosure. As shown in FIG. 15, the second access point includes:

a first receiving module 151, configured to receive, from a first access point, a D2D connection request sent by a first device, where the D2D connection request is for requesting an establishment of a D2D communication between the first device and a second device and carries an available channel resource of the first device, an identifier of the first device and an identifier of the second device, the first device is connected to the first access point, and the second device is connected to the second access point;

a first forwarding module 152, configured to send the D2D connection request to the second device based on the identifier of the second device;

a second receiving module 153, configured to receive a D2D connection request response returned from the second device, where the D2D connection request response carries a channel resource available for both the first device and the second device and the identifier of the first device; and a second forwarding module 154, configured to send the D2D connection request response to the first device via the first access point.

A detailed procedure of the resource negotiation for D2D communication performed by the second access point is same as that in the embodiment 10, which is accordingly not repeated herein.

The second access point according to the embodiment receives, via the first access point, the D2D connection request sent by the first device, forwards the D2D connection request to the second device connected to the second access point, and forwards the D2D connection request response to the first device via the first access point after receiving the D2D connection request response returned from the second device. Because the D2D connection request response carries the channel resource available for both the first and second devices, the first and second devices may determine a channel resource for a subsequent D2D communication, thereby completing the procedure of resource negotiation for D2D communication. Therefore, the resource negotiation for D2D communication between devices served by different access points is performed successfully and effectively to establish the D2D communication between the devices served by different access points.

Embodiment 16

Figure 16:
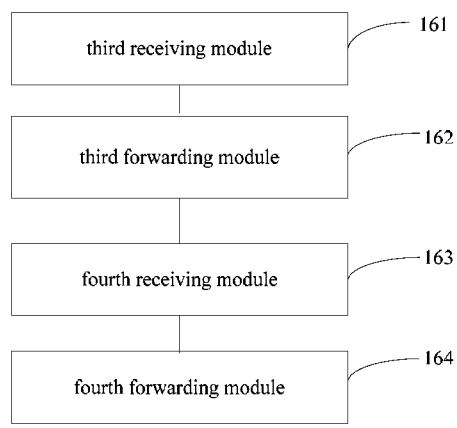
FIG. 16 is a schematic structural diagram of a first access point according to an embodiment of the present disclosure.

FIG. 16 is a schematic structural diagram of a first access point according to an embodiment of the present disclosure. As shown in FIG. 16, the first access point includes:

a third receiving module 161, configured to receive a D2D connection request sent by a first device, where the D2D connection request is for requesting an establishment of a D2D communication between the first device and a second device, the D2D connection request carries an available channel resource of the first device, an identifier of the first device and an identifier of the second device, the first device is connected to the first access point, and the second device is connected to a second access point;

a third forwarding module 162, configured to send the D2D connection request to the second access point;

a fourth receiving module 163, configured to receive a D2D connection request response returned from the second access point, where the D2D connection request response carries a channel resource available for both the first device and the second device and the identifier of the first device; and a fourth forwarding module 164, configured to send the D2D connection request response to the first device.

A detailed procedure of the resource negotiation for D2D communication performed by the first access point is same as that in the embodiment 12, which is accordingly not repeated herein.

The first access point according to the embodiment receives the D2D connection request sent by the first device, forwards the D2D connection request to the second access point connected to the second device so that the D2D connection request is sent to the second device via the second access point, and forwards the D2D connection request response to the first device after receiving the D2D connection request response returned from the second device and sent by the second access point. Because the D2D connection request response carries the channel resource available for both the first and second devices, the first and second devices may determine a channel resource for a subsequent D2D communication, thereby completing the procedure of resource negotiation for D2D communication. Therefore, the resource negotiation for D2D communication between devices served by different access points is performed successfully and effectively to establish the D2D communication between the devices served by different access points.

Embodiment 17

Figure 17:
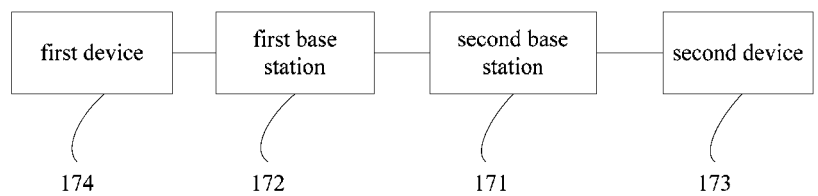
FIG. 17 is a schematic architectural diagram of a resource negotiation system for D2D communication according to an embodiment of the present disclosure.

FIG. 17 is a schematic architectural diagram of a resource negotiation system for D2D communication according to an embodiment of the present disclosure. As shown in FIG. 17, the resource negotiation system for D2D communication includes a second base station 171 according to the embodiment 13, a first base station 172 according to the embodiment 14, a second device 173 connected to the second base station 171 and a first device 174 connected to the first base station 172.

A detailed procedure of the resource negotiation for D2D communication performed by the resource negotiation system for D2D communication according to the embodiment is same as the work flows of the first and second base stations according to the above embodiments, which is accordingly not repeated herein.

With the resource negotiation system for D2D communication according to the embodiment, since the second base station obtains an available channel resource of the first device that is not connected to the second base station and can obtain an available channel resource of the second device connected to the second base station, the second base station allocates the D2D communication resource to the first device and the second device based on the available channel resource of the first device and the available channel resource of the second device, notifies the first device of the allocated D2D communication resource via the first base station connected to the first device, and notifies the second device of the allocated D2D communication resource via a connection between the second base station and the second device, thereby completing the procedure of resource negotiation for D2D communication. Therefore, the resource negotiation for D2D communication between devices served by different base stations is performed successfully and effectively to establish the D2D communication between the devices served by different base stations.

Embodiment 18

Figure 18:
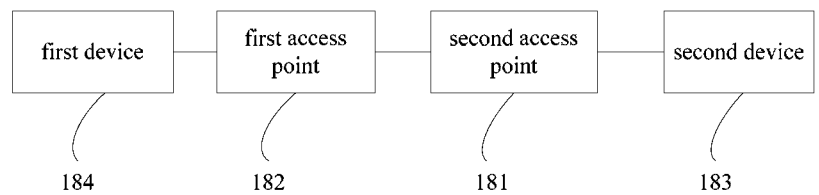
FIG. 18 is a schematic architectural diagram of a resource negotiation system for D2D communication according to another embodiment of the present disclosure.

FIG. 18 is a schematic architectural diagram of a resource negotiation system for D2D communication according to another embodiment of the present disclosure. As shown in FIG. 18, the resource negotiation system for D2D communication includes a second access point 181 according to the embodiment 15, a first access point 182 according to the embodiment 16, a second device 183 connected to the second access point 181 and a first device 184 connected to the first access point 182.

A detailed procedure of the resource negotiation for D2D communication performed by the resource negotiation system for D2D communication according to the embodiment is same as the work flow of the first and second access points according to the above embodiments, which is accordingly not repeated herein.

With the resource negotiation system for D2D communication according to the embodiment, the second access point receives, via the first access point, a D2D connection request sent by the first device, forwards the D2D connection request to the second device connected to the second access point, and forwards a D2D connection request response to the first device via the first access point after receiving the D2D connection request response returned from the second device. Because the D2D connection request response carries a channel resource available for both the first and second devices, the first and second devices may determine a channel resource for a subsequent D2D communication, thereby completing the procedure of resource negotiation for D2D communication. Therefore, the resource negotiation for D2D communication between devices served by different access points is performed successfully and effectively to establish the D2D communication between the devices served by different access points. Finally, it should be noted that the above embodiments are only for explaining the technical solutions of the disclosure rather than a limitation thereto. Although the disclosure is described in detail with reference to the preceding embodiments, it should be understood by those skilled in the art that modifications may be made to the technical solutions recorded in the preceding embodiments, or equivalents may replace a part of the technical features therein. However, with these modifications and equivalents, the essences of corresponding technical solutions do not depart from the scope of the technical solutions of the embodiments of the disclosure.

What is claimed is:

1. A resource negotiation method for device-to-device (D2D) communication, comprising:
   obtaining, by a second base station, an available channel resource of a first device, wherein the first device is connected to a first base station;
   allocating, by the second base station, a D2D communication resource for a D2D communication between the first device and a second device based on an available channel resource of the second device connected to the second base station and the available channel resource of the first device; and notifying, by the second based station, the second device of the allocated D2D communication resource, and notifying, by the second based station, the first device of the allocated D2D communication resource via the first base station.

2. The resource negotiation method for D2D communication according to claim 1, further comprising:

obtaining, by the second base station, the available channel resource of the second device.

3. The resource negotiation method for D2D communication according to claim 2, wherein obtaining the available channel resource of the first device and obtaining the available channel resource of the second device comprise:

sending, by the second base station, an available channel list querying request carrying an identifier of the first device and an identifier of the second device to a database, and receiving, by the second base station, an available channel list of the first device and an available channel list of the second device which are returned from the database.

4. The resource negotiation method for D2D communication according to claim 3, wherein before sending the available channel list querying request carrying the identifier of the first device and the identifier of the second device to the database, the method further comprises:

receiving, by the second base station, a D2D connection request sent by a core network, wherein the D2D connection request carries an identifier of the first base station, an identifier of the second base station, the identifier of the first device and the identifier of the second device.

5. The resource negotiation method for D2D communication according to claim 3, wherein before sending the available channel list querying request carrying the identifier of the first device and the identifier of the second device to the database, the method further comprises:

determining, by the second base station, to perform a frequency point handoff of a D2D communication link between the first device and the second device.

6. The resource negotiation method for D2D communication according to claim 1, wherein obtaining the available channel resource of the first device comprises:

receiving, by the second base station, the available channel resource of the first device sent by the first base station.

7. The resource negotiation method for D2D communication according to claim 6, wherein the available channel resource of the first device is an available channel list obtained by the first base station by querying the first device.

8. The resource negotiation method for D2D communication according to claim 6, wherein the available channel resource of the first device is sent by the first base station in response to a D2D connection request sent by a core network, and the D2D connection request carries an identifier of the first base station, an identifier of the second base station, an identifier of the first device and an identifier of the second device.

9. The resource negotiation method for D2D communication according to claim 6, wherein the available channel resource of the first device is sent by the first base station when the first base station determines to perform a frequency point handoff of a D2D communication link between the first device and the second device.

10. A resource negotiation method for device-to-device (D2D) communication, comprising:

receiving, by a first base station, a D2D connection request sent by a core network, wherein the D2D connection request carries an identifier of the first base station, an identifier of a second base station, an identifier of a first device and an identifier of a second device, or determining, by the first base station, to perform a frequency point handoff of a D2D communication link between the first device and the second device;

receiving, by the first base station, a notification message which is sent by the second base station and is for indicating a D2D communication resource for a D2D communication between the first device and the second device, wherein the D2D communication resource is allocated by the second base station, the first device is connected to the first base station, and the second device is connected to the second base station; and notifying, by the first base station, the first device of the D2D communication resource.

11. The resource negotiation method for D2D communication according to claim 10, wherein before receiving the notification message, the method further comprises:

sending, by the first base station, an available channel resource of the first device to the second base station.

12. A base station, comprising a processor and a non-transitory processor-readable medium having processor-executable instructions stored thereon, wherein the processor-executable instructions comprise a plurality of modules and the modules comprise:

a first obtaining module, a resource allocation module and a first notifying module which are connected with each other, wherein the first obtaining module is configured to obtain an available channel resource of a first device and provide the available channel resource of the first device to the resource allocation module, wherein the first device is connected to another base station;

the resource allocation module is configured to allocate a device-to-device (D2D) communication resource for a D2D communication between the first device and a second device based on an available channel resource of the second device connected to the base station and the available channel resource of the first device, and provide the allocated D2D communication resource to the first notifying module; and the first notifying module is configured to notify the second device of the allocated D2D communication resource and notify the first device of the allocated D2D communication resource via the another base station.

13. The base station according to claim 12, wherein the modules further comprise:

a second obtaining module, which is connected to the resource allocation module and is configured to obtain the available channel resource of the second device and send the available channel resource of the second device to the resource allocation module.

14. The base station according to claim 12, wherein the first obtaining module comprises:

a receiving unit, configured to receive the available channel resource of the first device sent by the another base station.

15. The base station according to claim 12, wherein the first obtaining module comprises:

an obtaining unit, configured to send an available channel list querying request carrying an identifier of the first device and an identifier of the second device to a database and receive an available channel list of the first device and an available channel list of the second device returned from the database.

16. The base station according to claim 15, wherein the modules further comprise a D2D connection request receiving module, and the D2D connection request receiving module is configured to receive a D2D connection request sent by a core network, wherein the D2D connection request carries an identifier of the another base station, an identifier of the base station, the identifier of the first device and the identifier of the second device.

17. The second base station according to claim 15, wherein the modules further comprise a handoff determining module, and the handoff determining module is configured to determine to perform a frequency point handoff of a D2D communication link between the first device and the second device.

* * * * *